United States Patent [19]

Land et al.

[11] 4,007,471
[45] Feb. 8, 1977

[54] SYSTEM FOR MOUNTING PHOTOGRAPHIC ACCESSORIES ON A CAMERA

[75] Inventors: Edwin H. Land; John B. Morse, both of Cambridge, Mass.

[73] Assignee: Polaroid Corporation, Cambridge, Mass.

[22] Filed: Apr. 17, 1975

[21] Appl. No.: 568,918

Related U.S. Application Data

[63] Continuation of Ser. No. 300,820, Oct. 25, 1972, abandoned.

[52] U.S. Cl. .............................................. 354/295
[51] Int. Cl.² ...................................... G03B 11/00
[58] Field of Search ............ 354/295, 296, 202, 76, 354/126; 240/1.3; 350/315, 318, 183; 95/11 R, 11 L, 11.5

[56] References Cited

UNITED STATES PATENTS

| | | | |
|---|---|---|---|
| 961,424 | 6/1910 | Wallace et al. | 350/315 X |
| 2,234,652 | 3/1941 | Prager | 95/11.5 R |
| 2,254,888 | 9/1941 | De Margitta | 95/11.5 R |
| 2,769,380 | 11/1956 | Rapaport | 95/31 AC |
| 2,949,838 | 8/1960 | Skalabrin | 95/86 |
| 3,274,910 | 9/1966 | Williams | 354/76 |
| 3,386,360 | 6/1968 | Nerwin | 240/1.3 X |
| 3,400,261 | 9/1968 | Jacob | 240/1.3 |
| 3,454,755 | 7/1969 | Wick et al. | 240/1.3 |
| 3,469,514 | 9/1969 | Denk | 354/202 X |
| 3,609,334 | 9/1971 | Iwaki | 240/1.3 |
| 3,609,649 | 9/1971 | Rigolini | 240/1.3 X |
| 3,809,878 | 5/1974 | Brandt | 240/1.3 |

FOREIGN PATENTS OR APPLICATIONS

| | | | |
|---|---|---|---|
| 626,331 | 8/1961 | Canada | 95/11.5 R |

*Primary Examiner*—L. T. Hix
*Assistant Examiner*—Kenneth C. Hutchison
*Attorney, Agent, or Firm*—John S. Vale

[57] ABSTRACT

A system for mounting accessories, e.g., filters, supplementary lenses, lens shades, etc., on a compact camera housing including a flash unit receiving socket. The system includes an accessory holder that is adapted to be connected to the camera flash socket to hold it on the housing. The holder includes a flash socket that is operatively connected to the camera socket when the holder is coupled thereto. Also special accessory mounts are provided for attaching accessories to the holder.

20 Claims, 6 Drawing Figures

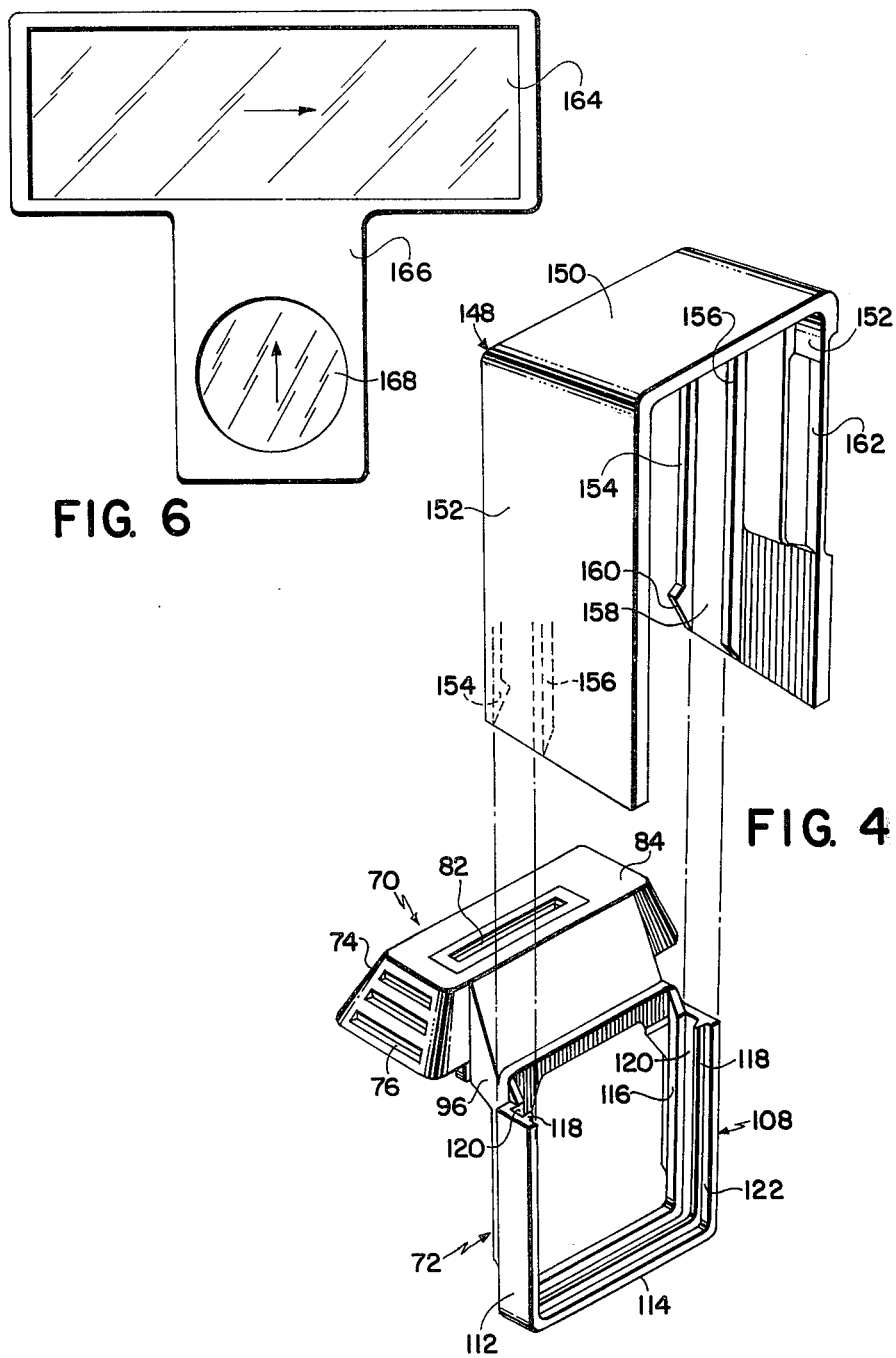

SYSTEM FOR MOUNTING PHOTOGRAPHIC ACCESSORIES ON A CAMERA

This is a continuation of application Ser. No. 300,820 filed on Oct. 25, 1972 now abandoned.

BACKGROUND OF THE INVENTION

The present invention relates to the field of photography and, more particularly, to a system for coupling accessories to a compact self-developing camera.

Any given combination of camera and film has inherent limitations. The film is designed to faithfully reproduce colors, images, and lighting conditions projected thereon by the camera's optical system. The optics generally have a well defined limited range of performance in terms of field of view, depth of focus, and minimum focusing distance.

When photographic conditions are encountered which fall outside of these limits, it is both desirable and necessary to modify the performance of the camera and film combination by utilizing accessory filters, lenses, and other aids.

For example, the source illuminating the scene to be photographed may introduce artificial coloring. By using a compensating filter in front of the objective lens, the natural color of the scene may be restored in the photographic rendition. Other filters may be employed to compensate for harsh lighting on high contrast subjects, haze, fog, low contrast subjects, etc. In other instances, it may be desirable to produce a photograph in which the natural colors and lighting conditions are modified for aesthetic reasons by utilizing suitable filters and/or polarizers.

The field of view and/or depth of focus of the camera's optical system may be changed by using suitable supplementary lenses in front of the objective. These may include wide angle, magnifying, telephoto, and other types of lenses.

Other accessories, such as a lens shade, may be employed to prevent light originating from points outside of the camera's optimum field of view from entering the objective lens.

In the prior art, such accessories are usually mounted on the front end of the objective lens by means of a threaded coupling ring surrounding the lens.

The self-developing camera with which the accessory mounting system of the present invention is adapted to be used is extremely small and compact in relation to the size of the positive print produced. Examples of such cameras may be found in U.S. Pat. Nos. 3,641,889 and 3,678,831.

To provide a precision threaded coupling ring around the objective lens is expensive because of the small diameter of the lens and its mounting arrangement. Furthermore, the threaded coupling system is relatively slow in terms of the time it takes the user to change accessories.

More importantly, the lens is mounted in a small (approximately 1½" × ¾" × 4") parallelepiped shaped housing section which also mounts a flash unit socket, a photocell, a light/dark exposure control wheel, a focusing wheel, a cable release socket, and a camera cycle start button. Therefore, the available space for attaching an accessory holder or mounting system to the lens housing is at an absolute minimum. Not only must the holder properly position the accessory in front of the objective, but its physical size and structural attachment must not block or impair the operation of any of the above-mentioned controls.

In a copending application, Ser. No. 246,917, filed on Apr. 24, 1972 by E. R. Brandt, now U.S. Pat. No. 3,747,490, an accessory holder is disclosed for use with the same compact self-developing camera. It comprises a resilient band of material which conforms to the shape of the lens housing and snaps therearound to hold the accessory in front of the objective lens. While this structure functions properly, it does have the drawback of being relatively expensive. Due to the flexing of the band encountered when mounting and removing the holder, it must necessarily be fabricated from an expensive material to preclude plastic deformation and/or stress fracture.

SUMMARY OF THE INVENTION

The present invention provides a simple, inexpensive, aesthetically pleasing, and easy to use accessory mounting system for the above-mentioned compact self-developing camera.

The system comprises a single accessory holder which is easily mounted on or removed from the lens housing in combination with a plurality of accessories adapted to fit into or to be connected to the holder. In a sense, the accessory holder may be considered to be a universal adapter for receiving a variety of camera accessories such as supplementary lenses, filters, lens shades, etc.

The holder is characterized by its unique structure for attaching itself to the lens housing. It fits into the camera's flash socket.

An auxiliary flash socket is integrally formed with the holder and includes structure for operationally connecting the holder socket to the camera socket. With the holder inserted in the camera flash socket, flash illumination may be provided by plugging a flash unit into the holder flash socket.

This unique arrangement allows the accessory holder to be mounted on the already crowded lens housing without interfering with the operation of any of the previously mentioned camera controls.

In a preferred embodiment the holder comprises a generally L-shaped support member whose component parts may be easily and inexpensively molded from plastic materials.

One leg of the L is adapted to be positioned over the top surface of the lens housing that supports the camera's flash socket. It also includes a flash socket plug, or terminal board connector, that fits into the camera socket and couples the support member to the housing in the same manner in which a flash unit would be coupled thereto.

The other leg of the L is thereby positioned in front of a forward lens housing wall mounting the objective lens. It is configured to define a generally U-shaped channel disposed around a portion of the lens circumference.

Most of the accessories in the system, e.g., supplementary lenses, filters, etc., are mounted on universal support plates or inserts that are adapted to slide into the U-shaped channel to position the accessory in operational relationship with the objective lens. Each insert has a pair of side rails or protrusions that are adapted to fit into the opposing sides of the channel for guiding the inserts to their fully inserted operative positions. Preferably, the rails are asymmetrically disposed on the sides of the inserts to preclude wrong way insertion.

Other accessories, such as a lens shade, are configured to include a generally U-shaped inverted channel at one end thereof that is adapted to fit over the sides of the holder channel. This type of construction allows at least two accessories (for example, a lens shade in combination with a close-up lens) to be mounted on the holder simultaneously.

The major advantages of this unique accessory mounting system are:

1. it is inexpensive—there are no precision threads to be molded or cut—the materials may be inexpensive because the component parts of the holder are not subjected to significant stress or flexing during attachment or removal;
2. it is easy and fast to use—there are no threaded couplings; and
3. the system is small and compact and, therefore, compatible with the small camera format.

It will be noted that the flash unit will be displaced from its intended position on the lens housing if mounted thereon without the universal holder being coupled to the flash socket. This displacement (raising the flash unit above the optic axis of the lens by approximately the thickness of the holder socket) does not effect normal picture taking situations. In some special situations the displacement may be advantageous.

Therefore, it is a characteristic an object of the present invention to provide a simple and easy to use system for mounting accessories on a compact camera lens housing.

It is another characteristic an object of the present invention to provide a system that comprises a universal accessory holder which is connectable to the housing by plugging it into the camera flash socket and one or more accessories that are adapted to be connected to the holder.

It is yet another characteristic an object to provide such a universal holder which includes an auxiliary flash socket as an integral part thereof for receiving a flash lamp and providing an operational connection between the auxiliary socket and the camera's flash system.

Other objects of the invention will in part be obvious and will in part appear hereinafter.

The invention accordingly comprises the product possessing the features, properties, and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 4 is a perspective view of a lens shade accessory and the universal accessory holder;

FIG. 6 is an elevational view of a T-shaped accessory insert that supports flash unit and lens polarizing filters.

DESCRIPTION OF THE PREFERRED EMBODIMENT

Figure 1:
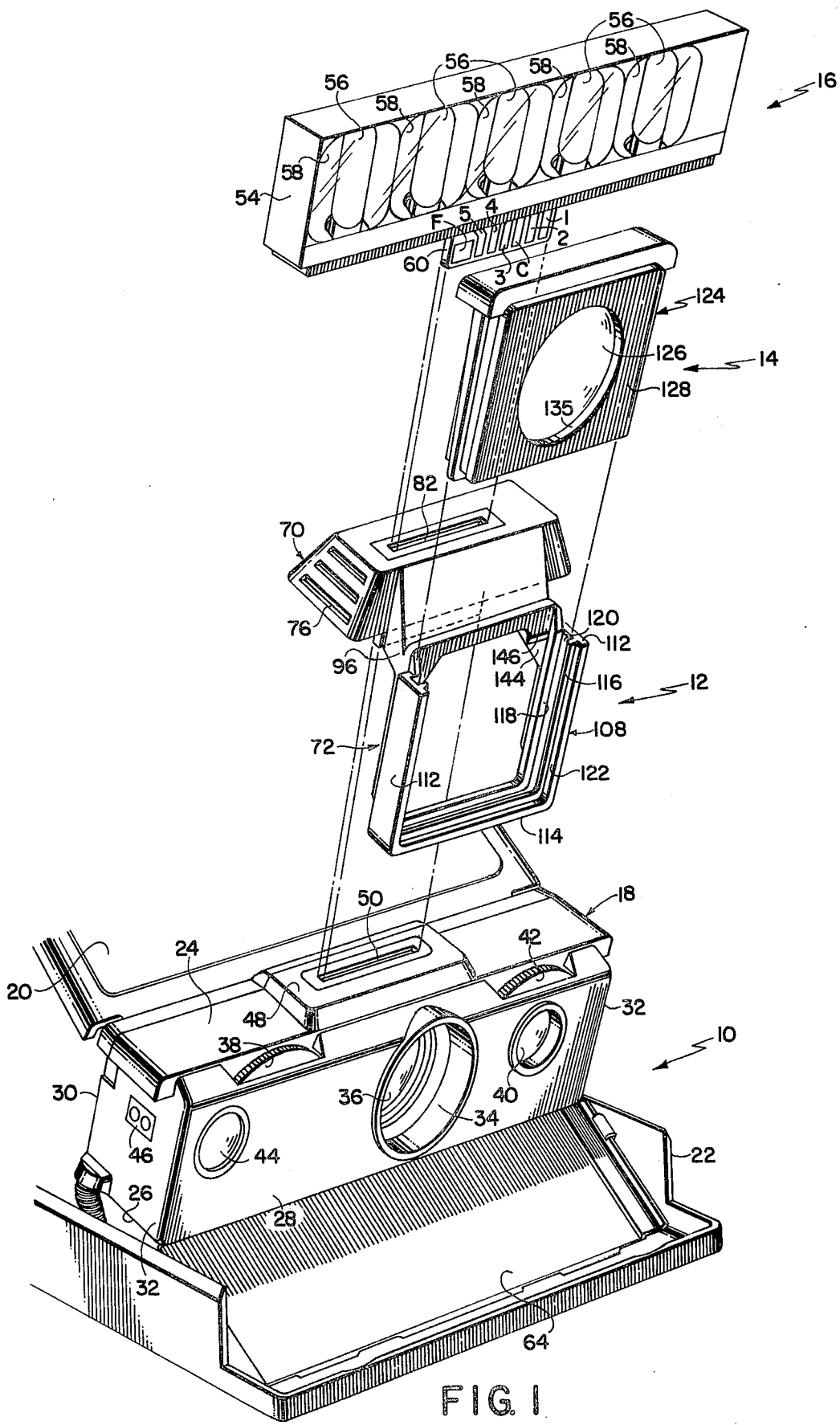
FIG. 1 is a perspective view showing the forward end of a compact self-developing camera including a compact parallelepiped shaped lens housing, a universal accessory holder embodying the present invention, a typical accessory adapted to be connected to the holder, and a linear flash array adapted to be plugged into a socket on the holder or lens housing.

FIG. 1 shows the front end of a compact self-developing camera 10, a universal accessory holder 12, a typical accessory lens or filter insert 14, and a linear array flash unit 16.

Camera 10 includes a housing formed by a plurality of housing sections which are pivotally interconnected for movement between a folded position and the operative extended position of FIG. 1.

For the sake of clarity and brevity, only the forward end of the camera will be shown and described since other parts of the camera are not involved with the instant invention.

We are principally interested in a lens housing 18 which is pivotally connected along its upper rear edge to an adjacent housing section 20 and along its bottom rear edge to a lower housing section (not shown) such that it is positioned in overlying relation to a forwardly extending housing section 22 when the camera is extended.

Lens housing 18 is formed by a top wall 24, a bottom wall 26, a forward wall 28, a rear wall 30, and a pair of side walls 32. These walls cooperate to define a relatively compact generally parallelepiped shaped housing measuring approximately 4" wide, 1.5" high, and 0.75" deep (from forward wall 28 to rear wall 30).

Disposed in forward wall 28 is a circular opening 34 for a moveably mounted objective lens 36 aligned therewith having its optic axis substantially normal to the plane of wall 28. At least the front lens element is adapted to be moved toward and away from wall 28 for focusing purposes by means of a rotatable focusing wheel 38 coupled integrally thereto.

Adjacent to lens 36 (to the right as viewed in FIG. 1) is a window 40 for admitting scene light into housing 18 such that it may impinge on a photocell (not shown) behind the window 40. The photocell forms parts of the camera's automatic exposure system. The amount of light striking the photocell may be varied by rotating a light/dark control wheel 42 to progressively introduce a wedge type neutral density filter into the optical path between window 40 and the photocell.

Within housing 18, but not shown in the drawings, is an electrically operated shutter, a complex electrical circuit board holding exposure control, flash, and camera operating circuits, a follow focus mechanism for flash mode operation, and other structure which need not be described here to understand the instant invention.

To the left (as viewed in FIG. 1) of focus wheel 38 is a camera cycle start button 44 for initiating a cycle of camera operation. The camera may also be operated from a remote location by connecting a suitable electronic switch cable to the socket 46 provided on housing side wall 32.

The top wall 24 of housing section 18 preferably includes an integrally formed, raised flash unit support pedestal 48 having an elongated opening 50 therein which communicate with and provides access to a flash unit socket or cavity 52 directly below opening 50 (see FIG. 2).

As best shown in FIG. 1, flash unit 16 comprises a generally parallelepiped shaped housing 54 enclosing, behind a transparent window, a linear array of five electrically ignitable flash lamps 56 and their individual reflectors 58.

Centrally disposed and depending from the bottom of housing 54 is a thin elongated insulative terminal board and connecting plug 60 which is adapted to be inserted into socket 52 to releasably secure the flash unit 16 to the camera in the desired orientation with respect to the lens axis and to connect the lamps 56 to the camera's electronic circuitry.

Disposed on the front side of the terminal board 60 are 7 vertically oriented and adjacently spaced conductive paths or contacts designated (from right to left in FIG. 1) 1, 2, C, 3, 4, 5, and F.

The contacts 1, 2, 3, 4, and 5 are connected, respectively, to one end of the filament wire of each of the five lamps 56 in the array. The sixth terminal C is connected to the other end of the filament wires of all five lamps. Thus electrical contact to the first lamp may be made by contacting contacts 1 and C. The second lamp may be contacted by making electrical connection to contacts 2 and C, etc.

The seventh conductive contact F is double the width of the others and is used to short out two terminals 62 in the camera socket 52 to convert the camera to its flash mode of operation. It will be noted that contact F is not electrically connected to any of the lamps in the array.

In a preferred embodiment the flash unit has a second set of five lamps and reflectors and seven (7) contacts on the reverse side of the flash unit 16.

Figure 2:
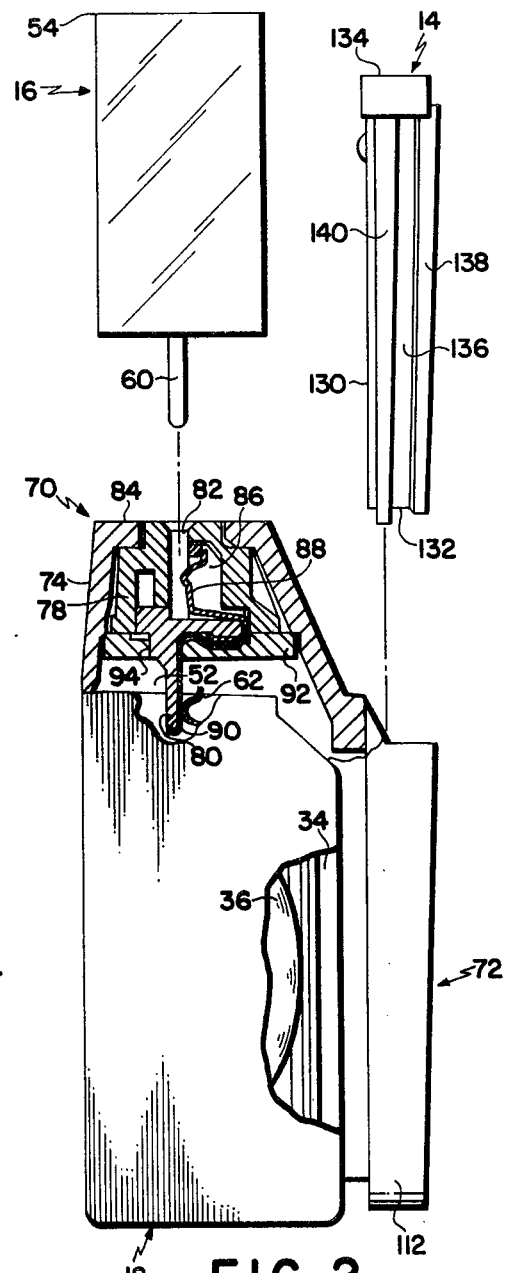
FIG. 2 is an elevational view, partly in section, of the lens housing of FIG. 1 showing the universal holder mounted thereon.

The flash socket 52 is provided with eight (8) vertically disposed, spaced, rearwardly facing spring contacts 62 therein (only one is shown in FIG. 2). The first six contacts within the socket are arranged to be in alignment with contacts 1, 2, C, 3, 4, and 5, respectively. The last two are aligned with the wide contact F.

With the terminal board 60 fully inserted into socket 52, the socket contacts 62 frictionally engage and make electrical contact to contacts 1, 2, C, 3, 4, 5, and F. The seventh and eighth contacts 62 are shorted together by contact F to close a normally open switch within the electronic circuit to convert the camera from the daylight to the flash mode of operation.

Without going into detail, the camera is provided with an electronic logic circuit for sequentially firing the lamps 56 without having to resort to a mechanical indexing system.

During a cycle of camera operation, initiated by actuating button 44, a film unit is exposed, either with or without flash illumination, and then is automatically advanced from its exposure position into engagement with a pair of processing rollers. The rollers are located beneath lens housing 18 and are blocked from view in FIG. 1 by a light baffle 64 mounted on housing section 22.

The rollers are rotatably driven to advance the film unit therebetween to progressively apply a compressive pressure along its length. As is well known to those who are familiar with instant photography, the pressure dispenses and distributes a processing fluid within the film unit to initiate a diffusion transfer process.

The liquid treated film unit exits from an opening on the underside of housing section 22.

For those that are interested in the details of the camera and film, reference may be had to the following disclosures; U.S. Pat. Nos. 3,641,889; 3,678,831; and 3,415,644; all of which are assigned to the same assignee as the present invention.

As noted earlier in this disclosure, it is desirable in some photographic situation to modify the performance range of the camera and film combination.

Most modification have to do with accessories, such as supplementary lenses, filters, and lens shades, that are mounted in front of or around the objective lens 34. However, other accessories that modify the performance of the photocell or the flash unit may also be employed.

For example, if a light attenuating filter is used on the objective, it is generally desirable to use some sort of light attenuating filter in front of the photocell to keep the automatic exposure control system in balance.

Likewise, if the field of view of the lens 36 is changed by means of a supplementary lens, a second supplementary lens may be positioned in front of window 40 to change the light acceptance angle of the photocell.

In some situations it may be desirable to modify the color of the light emitted from the flash unit lamps by using a suitable filter. In other instances, one may want to position a polarizing filter in front of the flash unit and cross-polarizing filter in front of the objective lens 36.

The accessory mounting system of the instant invention comprises a universal accessory mount or holder 12 and a plurality of accessories such as the filter or lens accessory 14 shown in FIG. 1, or the lens shade 148 shown in FIG. 4, that are adapted to be connected to holder 12 to place them in operative relationship with component parts of the camera or flash unit.

The accessory holder 12 is generally formed as an L-shaped structure comprising a first section 70 adapted to overlie the top wall 24 of camera housing section 18 and an integrally formed second section 72 disposed at substantially right angles to section 70 such that it overlies the forward wall 28 of housing section 18.

In a preferred embodiment accessory holder 12 and selected parts of the accessories that are adapted to be coupled thereto may be conveniently molded from any suitable plastic material such as a high-impact, styrene-type, thermoplastic resin supplied under the trademark Cycolac ® Grade D. H. by the Marbon Chemical Division.

The first holder section 70 comprises a hollow, thin walled, open ended, pedestal cap 74 which generally conforms to the shape of the raised flash socket pedestal 48 on housing 18 and is adapted to snuggly fit thereover. Cap 74 preferably includes integrally formed recesses 76 on its exterior lateral surfaces to provide a convenient gripping surface when attaching or removing the holder to the camera.

Mounted within the cap 74 is an auxiliary flash socket and holder connecting assembly. It comprises an elongated flash unit socket 78 which is essentially a duplicate of socket 52 provided in camera lens housing 18 and an integrally formed plug or terminal board connector or coupling means 80 depending therefrom for connecting holder 12 to the camera flash socket.

The holder socket 78 is characterized by an elongated opening 82, disposed in the same plane as the top planar surface 84 of cap 74, which communicates with an elongated cavity 86 therebelow that generally conforms to the shape of the flash unit terminal board 60.

Socket 78 is provided with 8 vertically disposed, spaced, and rearwardly facing contact springs 88 (only one is shown in FIG. 2) for making simultaneous frictional and electrical contact to the conductors 1, 2, C, 3, 4, 5, and F on the flash unit terminal board 60.

Depending from the bottom of socket 78 is the elongated insulated terminal board and connector or coupling means 80 which is generally the same size and shape as the terminal board 60 on the flash unit 16. It is provided with 8 vertically disposed and spaced electrically conductive contacts 90 on one side thereof (to the right as viewed in FIG. 2). One end of each of the conductive contacts 90 (see FIG. 3) terminates at the bottom edge of terminal board 80. The opposite ends are electrically connected to the lower ends of their counterpart electrical contacts 88 within socket 78.

As best shown in FIG. 2 a planar pad 92 having an opening 94 therein is provided for holding the socket and connector assembly within cap 74. The terminal board 80 is inserted through opening 94 and this assembly is inserted through the bottom opening in cap 74 to position the open end of socket 74 in alignment with the top opening of cap 74. With the assembly fully inserted, the edges of pad 92 may be permanently attached to the interior surface of the hollow cap 74 by any convenient method such as ultrasonic or adhesive bonding.

It will be noted that the lower end of terminal board or connector 80 extends below the bottom edge of cap 74 by a distance long enough to insure that it will be fully inserted into the flash unit socket 52 on the camera when the bottom edges of cap 74 engage and are supported by the exterior surface of the lens housing top wall 24.

The accessory holding portion of 72 of holder 12 is attached to the leading lower edge of cap 74 by means of an integrally molded section 96 that provide the right angle connection between holder sections 70 and 72.

While section 72 is an integrally molded structure, it will be described as consisting of component parts for the sake of clarity.

Figure 3:
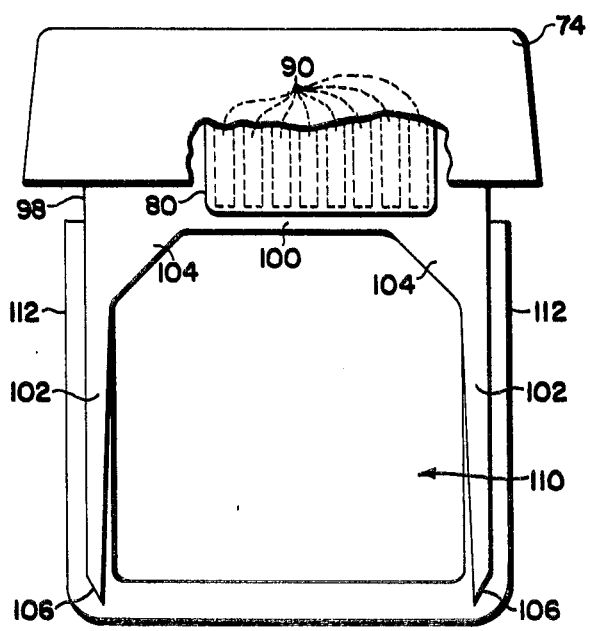
FIG. 3 is a rear elevational view, partly in section, of the universal accessory holder of FIG. 1.

Looking at FIG. 3 which is a rear elevational view of holder 12 with a portion of the rear wall of cap 74 cut away to expose the terminal board 80, it will be noted that the terminal board 80 is not centrally disposed between the lateral edges of cap 74 but is closer to the right hand edge (in FIG. 3).

It will be noted from FIG. 1 that the camera flash socket 52 is not symmetrically disposed with respect to the lens axis. This is to position the center lamp 56 in the array in a more desirable off axis relationship with respect to the objective lens.

The asymmetrically disposed terminal board compensates for this arrangement and thereby positions the accessory holding portion 72 directly in front of the objective lens 36.

The rearwardmost portion of section 72 comprises a generally U-shaped planar member 98 which includes a horizontal section 100 and a pair of elongated arms 102 depending from the lateral edges thereof. Gusset sections 104 are preferably provided at the intersections of section 100 and arms 102 to add strength and rigidity to the upper end of member 98.

It will be noted that the lower ends 106 of arms 102 are tapered at an acute angle with respect to the vertical. As will be described later the ends 106 serve as a locking detent for securing one particular type of accessory to holder section 72.

For the purposes of this disclosure, the holder cap 74, the integrally formed right angle connector 96, and the rearwardmost portion 98 of section 72 will be defined as a support member or base of holder 12 on which are mounted the flash socket 74, the terminal board connector 80, and an accessory receiving and holding member 108 to be described below.

The rearwardmost planar surface of member 98 is adapted to abut the exterior surface of lens housing 18 around lens 34 when the holder 12 is attached to camera 10. Integrally formed with its forwardmost surface and projecting forwardly therefrom is a generally U-shaped member 108. The closed end of U-shaped member 108 is at the bottom (as shown in FIG. 3) while the closed end of U-shaped member 98 is at the top. In combination they cooperate to form a generally rectangular frame to define a centrally opening 110 in holder section 72 that is larger than and is adapted to be coaxially disposed with objective lens 36.

As best shown in FIG. 1, member 108 comprises a pair of vertically disposed side members 112 and a horizontally disposed member 114 that connects the lower ends of side members 112.

Figure 5:
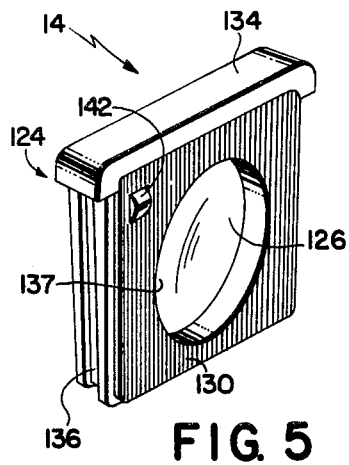
FIG. 5 is a perspective view of the back side of a typical accessory "insert"

Integrally formed on the interior surface of U-shaped member 108 are a pair of generally U-shaped projections 116 and 118 which cooperate with members 112 and 114 to define a pair of accessory guide and receiving channels 120 and 122 for receiving an accessory 14 of the type shown in FIGS. 1, 2, and 5.

This type of accessory 14 comprises a generally rectangular or square accessory mounting plate 124 or insert that is adapted to be inserted into the channels 120 and 122 on holder member 108 in combination with an appropriate accessory 126 (e.g., lens or filter) mounted thereon.

Plate 124 comprises a forward planar wall 128, a rear planar wall 130, a bottom wall 132, a top wall 134 and a pair of side walls 136. The forward and rear walls 128 have coaxially disposed openings 135 and 137 therein between which an accessory lens or filter 126 is mounted.

It will be obvious to one skilled in the art that plate 124 may be fabricated in two parts. For example, top wall 134 may be fabricated separately and then bonded to the top of forward and rear walls 128 and 130 after the accessory lens or filter has been inserted therebetween.

In order to releasably secure plate 124 to holder member 108, plate 124 is provided with a pair of asymmetrically disposed (with respect to the given forward to rear dimension or thickness of plate 124) projections 138 and 140 that are adapted to be received in holder channels 120 and 122. The forwardmost projection 138 is substantially an extension of the planar forward wall 128 and extends outwardly from side walls 138 and bottom wall 132. The rearwardmost projection 140 is set slightly forwardly (to the right as viewed in FIG. 2) of rear wall 130 and also extends outwardly from side walls 136 and bottom wall 132.

As best shown in FIG. 2, accessory 14 is positioned over the open top of holder member 108. The forward accessory plate projection 138 fits within the forward holder channel 122 and the rearward projection 140 fits into channel 120. The accessory 14 then may be moved downwardly into its fully inserted position within holder 108 to position the accessory lens or filter 126 in front of the camera's objective lens 36.

It will be noted that the actual connection between the holder and the accessory insert is provided by the insertion of projection 140 into channel 120. Projection 138 and channel 122 are provided to produce an aesthetically pleasing interface between the holder and the accessory insert and are not necessary or critical parts of the instant invention.

The top wall 134 of accessory mounting plate 124 extends outwardly beyond the side walls 136 and overlie the tops of holder sidewalls 112 when the insert 124 is in its fully inserted operative position. In a preferred embodiment, the top wall 134 also extends just slightly beyond the exterior lateral surfaces of sidewalls 112. This provides a pair of convenient lateral gripping surfaces for lifting the insert plate 124 out of holder section 108.

In a preferred embodiment the insert plate is slightly tapered in its lateral dimension to reduce in size from the top of the plate to its bottom. Channels 120 and 122 are also tapered in a confirming manner. This type of structure makes it easier for the user to insert the narrower bottom of plate 124 into the wider upper ends of channels 120 and 122.

In order to releasably lock insert plate 124 in its fully inserted position, a depressible detent spring 142 is provided in the rear wall 130 of plate 124. As best shown in FIG. 1, holder member 108 is provided with a forwardly facing recess 144 for receiving the outwardly extending spring 142 to lock plate 124 in holder section 108. As plate 128 is lifted from holder section, an inclined surface 146 of recess 144 bears against spring 142 and depresses it into the rear wall 130 thereby unlocking plate 124.

It will be noted that the asymmetrical front to rear disposition of the projection 140 on plate 124 prevents the plate front being inserted into holder in a backwards manner. Also the lateral extensions on top wall 134 prevent it from being inserted upside down.

Another type of accessory that is adapted to be coupled to holder section 108, either simultaneously with accessory 14 or alone, is shown in FIG. 4. The accessory shown is a lens hood or shade 148 that is adapted to extend forwardly of lens housing 18 around lens 36 to block light originating from points outside of the objective lens' optimum field of view, especially overhead sunlight.

In its preferred embodiment, lens shade 148 is comprised of a top planar wall 150 and a pair of integrally molded side walls 152 depending from the lateral edges thereof. Integrally formed with the interior surfaces of walls 150 and 152 are a pair of spaced inwardly extending projections 154 and 156 that cooperate with the interior surfaces of their walls to define a generally U-shaped channel 158 therebetween.

The shade 148 is attached to holder section 108 by aligning the lower open ends of channels 158 with the top ends of the holder side walls 112 and pushing the shade downwardly over the outside of holder section 108.

The lower ends of projections 154 each included an integrally molded and inwardly facing detent 160 that is adapted to engage the lower angled ends 106 of the holder arms 102 (see FIG. 3).

Unlike the accessory inserts 124, the shade 148 fits on the outside of the holder section 108. The interior shade channel 158 is of sufficient size that it may be coupled to section 108 while an accessory insert 124 is fully inserted therein at the same time.

The shade may be removed from the accessory holder by lifting it upwardly thereby causing detents 160 to disengage from the ends 106 of hold arms 102.

In passing, one will note that an angled opening 162 is provided in the right (as viewed in FIG. 4) hood side wall 152. It serves to allow light reflected from the scene to be photographed to pass therethrough and impinge upon the camera photocell window 40. Because of the compact nature of the lens housing 18 and the close proximity of lens 36 and photocell window 40, a solid sidewall 152 would tend to prevent light reflected from portions of the scene from reaching the window 40. A more detailed description of lens hood 148 and its operation may be found in the copending application of Philip G. Baker, et al., Ser. No. 300,809, filed on even date herewith, now U.S. Pat. No. 3,759,153.

The insert type of accessory and externally coupling lens shade have been presented to illustrate two generic types of accessories that may be simultaneously or independently coupled to the holder section 108. They are intended to be illustrative of a family of accessory that may be used with this "universal" accessory holder 12.

For example, it may be desirable to position a polarizing filter front of the flash unit and a rotatable crosspolarizing filter in front of the objective lines 36. In this instance, an insert type of accessory may be used. As best shown in FIG. 6, the accessory comprises a generally rectangular polarizing filter 164 dimensioned to cover the front of the linear flash array unit 16. Depending from the lower edge of the filter 164 is generally flat support member 166 whose lower end is suitably configured like plate 124 to be inserted into the channels 120 and 122 of holder section 108. Member 166 has a central opening therein which holds a rotatable bezel mounting a second polarizing filter 168 that is adapted to be positioned in front of lens 34 when member 166 is fully inserted into holder section. In an alternative embodiment, the flash unit polarizing filter may be attached to the top of a lens shade 148 and the second filter 166 may be mounted in an insert plate 124.

In some applications it is desirable to provide a filter in front of lens 36 and a compensating filter in front of photocell window 40. In this instance a filter insert plate 124 may be provided with an extension integrally formed with top wall 134 for holding an auxiliary filter in front of window 40. In another embodiment, the lens hood 148 may be provided with such an extension.

In operation, the accessory holder 12 is plugged into the camera socket 52 in the manner previously described. The eight camera socket contact springs 62 frictionally engage and make simultaneous electrical contact to the eight electrical conductors 90 on the one side of the holder terminal board 80. Thus electrical continuity is established between the camera socket contacts 62 and their counterpart contacts 88 in the holder socket 86. It will be noted that the mounting of holder 12 on camera 10 does not change the operational mode of the camera from the daylight mode to the flash mode. This occurs when the flash unit terminal board 60 is plugged into the holder socket 86 and the double conductor F thereon shorts out the seventh and eighth contacts 88 in the holder socket.

With holder 12 mounted on camera 10, the flash unit 12 is raised above the lens axis approximately 0.5 inches from the position it would occupy if it was plugged directly into the camera socket 52.

In most instances the upward displacement of the flash unit does not create a significant change in the distribution of light directed towards the scene to be photographed. However, in some special situations, such as in portrait work, the slight shift in light distribution may help reduce the common photographic phenomenon popularly referred to as "red eye."

Since certain changes may be made in the above produce without departing from the scope of the invention herein involved, it is intended that all matter contained in the above description or shown in the accompanying drawings shall be interpreted as illustrative and not in a limiting sense.

We claim:

1. An accessory holder for receiving and supporting one or more accessories on a camera of the type including a compact, generally parallelpiped shaped housing section having a flash unit socket therein that is accessible through an elongated opening in a top wall of the housing section, an objective lens mounted in alignment with a lens opening in a forward wall of the housing section that is oriented at substantially a right angle with respect to the top wall of the housing section, and flash unit actuating means operatively connected to the flash unit socket, said accessory holder comprising:
a support member including a first section adapted to overlie the top wall of the housing section and a second section coupled to said first section at substantially a right angle thereto such that it is adapted to overlie the forward wall of the housing section;
means on said second section including means defining a U-shaped channel having open ends proximate the intersection of said first and second sections for receiving and holding one or more accessories on said support member in alignment with a central opening in said second section defined by portions of said second section and said means defining said U-shaped channel;
coupling means on said first support member section including an elongated terminal board that is adapted to be inserted through the elongated opening in the top wall of the camera housing section and connected to the camera's flash unit socket thereby releasably coupling said support member to the camera housing section such that accessories held by said means defining said U-shaped channel are positioned in operative relation with the camera;
a flash unit socket on said first support member section for receiving and supporting a flash unit thereon; and
electrical connection means operatively associated with said flash unit socket and said terminal board for operatively connecting a flash unit supported by said flash unit socket on said first support member section to the camera's flash unit actuating means when said support member is connected to the camera's flash unit socket by said terminal board.

2. An accessory holder as defined in claim 1 wherein one type of accessory is mounted on a mounting plate that is adapted to be inserted into said U-shaped channel through its open ends and includes protruding resilient latch member extending outwardly from the mounting plate and said second support member section further includes a recess integrally formed therewith for receiving the latch member to releasably secure the mounting plate to said second section when the mounting plate is fully inserted in said U-shaped channel.

3. An accessory holder as defined in claim 1 wherein one type of accessory includes a member that defines a U-shaped channel thereon that is adapted to slide over an exterior surface of said means defining said U-shaped channel on said second support member section to couple the accessory to said second support member section and further includes at least one latch member thereon and said second support member section further includes at least one detent thereon for receiving the latch member.

4. A system for releasably securing one or more accessories to a camera of the type including a housing having a flash unit socket thereon and flash unit actuating means operatively associated with the socket, said system comprising:
an accessory holder including:
a support member;
means on said support member for receiving and holding one or more accessories on said support member, said receiving and holding means including means defining an open ended channel;
a connector on said support member configured to be inserted into and held by the camera flash unit socket to releasably secure said support member to the camera so that accessories held on said support member are positioned in operative relation with the camera;
a flash unit socket on said support member for supporting a flash unit; and
means for operatively connecting a flash unit supported by said flash unit socket on said support member to the flash unit actuating means of the camera when said connector is inserted into the camera flash unit socket;
in combination with a camera accessory comprising:
a component adapted to modify the performance of the camera; and
component support means for mounting said component and being adapted to be received and held in said open ended channel for connecting said mounted component to said receiving and holding means on said support member.

5. A system as defined in claim 4 wherein said accessory component support means includes a mounting plate dimensioned to be slideably inserted into said channel.

6. A system as defined in claim 4 wherein said accessory component support means includes means defining a channel thereon that is dimensioned to be slideably inserted over the exterior of said means defining said open ended channel on said support member.

7. A system for releasably securing one or more accessories to a camera of the type including a housing having an objective lens and a flash unit socket mounted thereon and flash unit actuating means operatively associated with the socket, said system comprising:
an accessory holder including:
a support member;
means on said support member for receiving and holding one or more accessories on said support member;

a connector on said support member configured to be inserted into and held by the camera flash unit socket to releasably secure said support member to the camera so that said means on said support member for receiving and holding one or more accessories is positioned in front of the objective lens;

a flash unit socket on said support member for supporting a flash unit; and means for operatively connecting a flash unit supported by said flash unit socket on said support member to the flash unit actuating means of the camera when said connector is inserted into the camera flash unit socket;

in combination with a camera accessory comprising:

a component adapted to modify the performance of the camera; and component support means for mounting said component and for connecting said mounted component to said receiving and holding means on said support member.

8. A system for releasably securing one or more accessories to a camera of the type including a housing having a flash unit socket thereon and flash unit actuating means operatively associated with the socket, said system comprising:

an accessory holder including:

a support member;

means on said support member for receiving and holding one or more accessories on said support member;

a connector on said support member configured to be inserted into and held by the camera flash unit socket to releasably secure said support member to the camera so that accessories held on said support member are positioned in operative relation with the camera;

a flash unit socket on said support member for supporting a flash unit; and means for operatively connecting a flash unit supported by said flash unit socket on said support member to the flash unit actuating means of the camera when said connector is inserted into the camera flash unit socket;

in combination with a camera accessory comprising:

a component adapted to modify the performance of the camera and including one or more filters; and component support means for mounting said component and for connecting said mounted component to said receiving and holding means on said support member.

9. A system for releasably securing one or more accessories to a camera of the type including a housing having a flash unit socket thereon and flash unit actuating means operatively associated with the socket, said system comprising:

an accessory holder including:

a support member;

means on said support member for receiving and holding one or more accessories on said support member;

a connector on said support member configured to be inserted into and held by the camera flash unit socket to releasably secure said support member to the camera so that accessories held on said support member are positioned in operative relation with the camera;

a flash unit socket on said support member for supporting a flash unit; and means for operatively connecting a flash unit supported by said flash unit socket on said support member to the flash unit actuating means of the camera when said connector is inserted into the camera flash unit socket;

in combination with a camera accessory comprising:

a component adapted to modify the performance of the camera and including one or more supplementary lenses; and component support means for mounting said component and for connecting said mounted component to said receiving and holding means on said support member.

10. A system for releasably securing one or more accessories to a camera of the type including a housing having a flash unit socket thereon and flash unit actuating means operatively associated with the socket, said system comprising:

an accessory holder including:

a support member;

means on said support member for receiving and holding one or more accessories on said support member;

a connector on said support member configured to be inserted into and held by the camera flash unit socket to releasably secure said support member to the camera so that accessories held on said support member are positioned in operative relation with the camera;

a flash unit socket on said support member for supporting a flash unit; and means for operatively connecting a flash unit supported by said flash unit socket on said support member to the flash unit actuating means of the camera when said connector is inserted into the camera flash unit socket;

in combination with a camera accessory comprising:

a component adapted to modify the performance of the camera and including a lens shade; and component support means for mounting said component and for connecting said mounted component to said receiving and holding means on said support member.

11. A system for releasably securing one or more accessories to a camera of the type including a housing having a flash unit socket thereon and flash unit actuating means operatively associated with the socket, said system comprising:

an accessory holder including:

a support member;

means on said support member for receiving and holding one or more accessories on said support member, said receiving and holding means including means defining an open ended channel;

a connector on said support member configured to be inserted into and held by the camera flash unit socket to releasably secure said support member to the camera so that accessories held on said support member are in operative relation to the camera;

a flash unit socket on said support member for supporting a flash unit; and means for operatively connecting a flash unit supported by said flash unit socket on said support member to the flash unit actuating means of the camera when said connector is inserted into the camera flash unit socket;

in combination with a camera accessory comprising:
a component adapted to modify the performance of the camera; and
first and second types of component support means for mounting said component and for connecting said mounted component to said receiving and holding means on said support member, said first type of component support means being adapted to be slideably inserted into said channel and said second type of component support means being adapted to be coupled to the exterior of said means defining a channel on said support member such that component support means of said first and second type may be held on said support member simultaneously.

12. An accessory holder for receiving and supporting at least one accessory other than a flash unit on a camera of the type including a housing having a top wall mounting a flash unit socket thereon for receiving and supporting a flash unit, means within the housing for actuating a flash unit supported by the flash unit socket and a forward wall disposed at substantially right angles to the top wall and mounting an objective lens thereon, said accessory holder comprising:
a support member including a first section and a second section coupled to said first section such that said first and second sections are oriented at substantially right angles to one another, said first section being adapted to overlie the top wall of the camera housing and said second section being adapted to overlie the forward wall of the camera housing;
means on said second section of said support member for receiving and holding at least one accessory other than a flash unit to position the accessory in front of the objective lens;
coupling means on said support member configured to be connected to the camera's flash unit socket for releasably coupling said support member to the camera housing such that accessories other than a flash unit held on said support member are positioned in operative relation with the camera;
a flash unit socket on said support member for receiving and supporting a flash unit thereon; and
connecting means associated with said coupling means for operatively connecting a flash unit supported by said flash socket on said support member to the camera's flash unit actuating means when said support member is coupled to the camera's flash unit socket by said coupling means.

13. Apparatus for a camera, the camera being of the type having a flash unit socket therein, a thin elongated opening providing access to the flash socket, and an objective lens, said apparatus comprising:
a support member;
a thin elongated coupling plug extending from said support member and configured to be snugly nested in the camera's opening to releasably mount said apparatus on the camera;
a flash socket on said support member for mounting a flash unit;
means on said support member and said coupling plug for electrically coupling said flash socket on said support member to the flash socket on the camera when said apparatus is mounted on the camera; and
coupling means, including tactile discontinuities, on said support member independent of said flash socket on said support member for releasably engaging and supporting a camera accessory other than the flash unit.

14. The apparatus of claim 13 wherein said coupling means comprises at least one elongated member configured to slideably receive the other accessory.

15. The invention of claim 13 wherein the other accessory is of the type serving to influence the exposure of film within the camera when operably disposed with respect to a given component of the camera and wherein said coupling means is configured to position the other accessory in operative relationship with respect to the given component of the camera when said apparatus is mounted on the camera and the other accessory is positioned in said coupling means.

16. The invention of claim 15 wherein the other accessory comprises an optical element and said coupling means is configured to position the optical element over the camera's objective lens.

17. A system for releasably connecting at least one accessory other than a flash unit on a camera of the type including a housing having a flash socket therein that is accessible through a thin elongated opening in the housing; said system comprising:
an accessory holder including;
a support member having first and second sections, said second section including a generally planar wall portion;
a thin elongated coupling plug on said first section being dimensioned to be inserted through the thin elongated opening in the camera housing and into the flash socket therein for releasably coupling said support member to the camera; and
means on said second section of said support member for receiving and supporting a camera accessory other than a flash unit, said receiving and supporting means including a pair of open ended channels extending forwardly, a given dimension, of said generally planar wall portion;
in combination with an accessory comprising:
an accessory mounting plate having a forward wall, a rear wall, and a pair of side walls intermediate said forward and rear walls;
means on said accessory mounting plate for mounting thereon an accessory, other than a flash unit, for modifying the performance of the camera; and
a pair of projections, one on each of said side walls of said mounting plate and extending outwardly therefrom, being configured to be slideably inserted into said pair of channels on said support member for coupling said mounting plate thereto, said pair of projections being asymmetrically disposed on said side walls, with respect to said forward and rear walls, and being spaced from said rear wall by said given dimension and being spaced from said forward wall a dimension greater than said given dimension so that said pair of projections may only be inserted into said pair of channels when said rear wall of said mounting plate is adjacent said generally planar wall of said second section of said support member.

18. An accessory holder for receiving and supporting at least one accessory other than a flash unit on a camera of the type including a housing section having a flash unit socket therein, a thin elongated opening in the housing section providing access to the flash socket, and means on the housing section for mounting an objective lens, said accessory holder comprising:
- a support member;
- a thin elongated coupling plug on the support member being dimensioned to be inserted through the thin elongated opening in the camera housing and into the camera flash socket therein for releasably coupling said support member to the camera;
- means on said support member for receiving and supporting at least one accessory other than a flash unit and for positioning the accessory in proximity to the camera objective lens when said support member is so coupled to the camera, said receiving and supporting means including at least one open ended channel into which at least a portion of the accessory is adapted to be slideably inserted;
- a flash unit socket on said support member for receiving and supporting a flash unit; and
- means on said coupling plug for operatively connecting said flash unit socket on said support member to the flash unit socket of the camera when said coupling plug is inserted into the flash unit socket of the camera.

19. An accessory holder for receiving and supporting at least one accessory other than a flash unit on a camera of the type including a housing section having a top wall with a thin elongated opening therein providing access to a flash unit socket within the housing section and a forward wall disposed at substantially right angles to the top wall and having means thereon for mounting an objective lens, said accessory holder comprising:
- a support member including first and second sections disposed at substantially right angles to one another and being configured to overlie, respectively, the top and forward walls of the camera housing section;
- a thin elongated coupling plug on said first support member section being dimensioned to be inserted through the thin elongated opening in the top wall of the camera housing section and into the camera flash unit socket for releasably coupling said support member to the camera with said first support member section in overlying relation to the top wall and said second support member section in overlying relation to the forward wall of the camera housing section in proximity to the objective lens;
- means on said second support member section for receiving and supporting at least one accessory other than a flash unit in operative relation to the camera when said accessory holder is so coupled to the camera;
- a flash unit socket on said first support member section for receiving and supporting a flash unit; and
- means for operatively connecting said flash unit socket on said first support member section to the flash unit socket of the camera when said coupling plug is inserted into the flash unit socket of the camera.

20. An accessory holder for receiving and supporting at least one accessory other than a flash unit on a camera of the type including a housing section having a top wall with a thin elongated opening therein providing access to a flash unit socket within the housing section and a forward wall disposed at substantially a right angle to the top wall and including an opening therein providing access for the camera's objective lens, said accessory holder comprising:
- a support member including first and second sections disposed at substantially right angles to one another and being configured to overlie, respectively, the top and forward walls of the camera housing section,
- a thin elongated connection plug on said first support member section being dimensioned to be inserted through the thin elongated opening in the top wall of the camera housing section and into the camera flash socket within the camera housing section for releasably coupling said support member to the camera with said first support member section in overlying relation to the top wall of the camera housing section and said second support member section in overlying relation to the forward wall of the camera housing section in proximity to the objective lens; and
- means on said second support member section for receiving and supporting at least one accessory other than a flash unit in operative relation with the camera when said accessory holder is so coupled to the camera said receiving and supporting means including means defining a U-shaped channel having open ends proximate the intersection of said first and second support member sections and through which at least a portion of such an accessory is adapted to be slideably inserted, said U-shaped channel being disposed on said second support member section to cooperate with a portion thereof for defining an open frame which extends forwardly of the forward wall of the camera housing section and surrounds the objective lens opening therein when said accessory holder is so coupled to the camera.

* * * * *